(12) United States Patent
Kim et al.

(10) Patent No.: US 12,155,028 B2
(45) Date of Patent: Nov. 26, 2024

(54) APPARATUS AND METHOD FOR CONTINUOUSLY MANUFACTURING ELECTRODE

(71) Applicant: LG ENERGY SOLUTION, LTD., Seoul (KR)

(72) Inventors: Suk Kim, Daejeon (KR); Wonhak Cho, Daejeon (KR)

(73) Assignee: LG ENERGY SOLUTION LTD., Seoul (KR)

( * ) Notice: Subject to any disclaimer, the term of this patent is extended or adjusted under 35 U.S.C. 154(b) by 0 days.

(21) Appl. No.: 18/022,934

(22) PCT Filed: Mar. 4, 2022

(86) PCT No.: PCT/KR2022/003058
§ 371 (c)(1),
(2) Date: Feb. 23, 2023

(87) PCT Pub. No.: WO2022/191511
PCT Pub. Date: Sep. 15, 2022

(65) Prior Publication Data
US 2023/0318006 A1  Oct. 5, 2023

(30) Foreign Application Priority Data

Mar. 9, 2021 (KR) .......... 10-2021-0030954
Mar. 3, 2022 (KR) .......... 10-2022-0027640

(51) Int. Cl.
*H01M 10/04* (2006.01)
*B65H 21/00* (2006.01)
(Continued)

(52) U.S. Cl.
CPC ........ *H01M 10/0404* (2013.01); *B65H 21/00* (2013.01); *B65H 26/02* (2013.01);
(Continued)

(58) Field of Classification Search
CPC .................................................. B65H 26/02
See application file for complete search history.

(56) References Cited

U.S. PATENT DOCUMENTS

2019/0232605 A1   8/2019   Fernando et al.
2020/0235433 A1   7/2020   Kim et al.

FOREIGN PATENT DOCUMENTS

CN    102680485 A    9/2012
CN    103052580 A    4/2013
(Continued)

OTHER PUBLICATIONS

English machine translation of JP2004244200 (Year: 2004).*
English machine translation of CN210730197 (Year: 2019).*

*Primary Examiner* — Scott W Dodds
(74) *Attorney, Agent, or Firm* — Bryan Cave Leighton Paisner LLP

(57) ABSTRACT

An apparatus for manufacturing an electrode includes a plurality of guide rollers configured to transport an electrode plate. The apparatus detects a defect on the electrode plate being transported and cut, upon detecting the defect, the electrode plate at a starting part of the defect on the electrode plate to form a defective electrode plate. The apparatus also includes a first taping part connecting the defective electrode plate to a defective electrode roll. The apparatus cuts the electrode plate at an ending part of the defect on the electrode plate to form a normal electrode plate. The apparatus connects the normal electrode plate separated from the defective electrode plate in the second cutting part with a normal electrode roll. The apparatus winds and transports the normal electrode roll.

9 Claims, 3 Drawing Sheets

(51) Int. Cl.
*B65H 26/02* (2006.01)
*B65H 27/00* (2006.01)
*H01M 4/04* (2006.01)
*H01M 4/139* (2010.01)

(52) U.S. Cl.
CPC .............. *B65H 27/00* (2013.01); *H01M 4/04* (2013.01); *H01M 4/139* (2013.01); *B65H 2301/46178* (2013.01); *B65H 2301/4631* (2013.01); *B65H 2701/19* (2013.01)

(56) References Cited

FOREIGN PATENT DOCUMENTS

| | | | | | |
|---|---|---|---|---|---|
| CN | 104511938 | A | | 4/2015 | |
| CN | 108258189 | A | | 7/2018 | |
| CN | 109659629 | A | | 4/2019 | |
| CN | 109952678 | A | | 6/2019 | |
| CN | 210730197 | U | * | 6/2020 | |
| JP | 2004244200 | A | * | 9/2004 | ............ B65H 26/02 |
| JP | 5659818 | B2 | | 1/2015 | |
| JP | 2015-232967 | A | | 12/2015 | |
| JP | 2018085206 | A | | 5/2018 | |
| JP | 2018-113110 | A | | 7/2018 | |
| JP | 2019071205 | A | | 5/2019 | |
| JP | 6525943 | B2 | | 6/2019 | |
| JP | 2019-189281 | A | | 10/2019 | |
| KR | 10-1330880 | B1 | | 11/2013 | |
| KR | 10-1384954 | B1 | | 4/2014 | |
| KR | 10-1392622 | B1 | | 5/2014 | |
| KR | 10-1479723 | B1 | | 1/2015 | |
| KR | 10-2015-006284 | A | | 6/2015 | |
| KR | 10-1835710 | B1 | | 4/2018 | |
| KR | 10-2018-0119946 | A | | 11/2018 | |

\* cited by examiner

[FIG. 1]
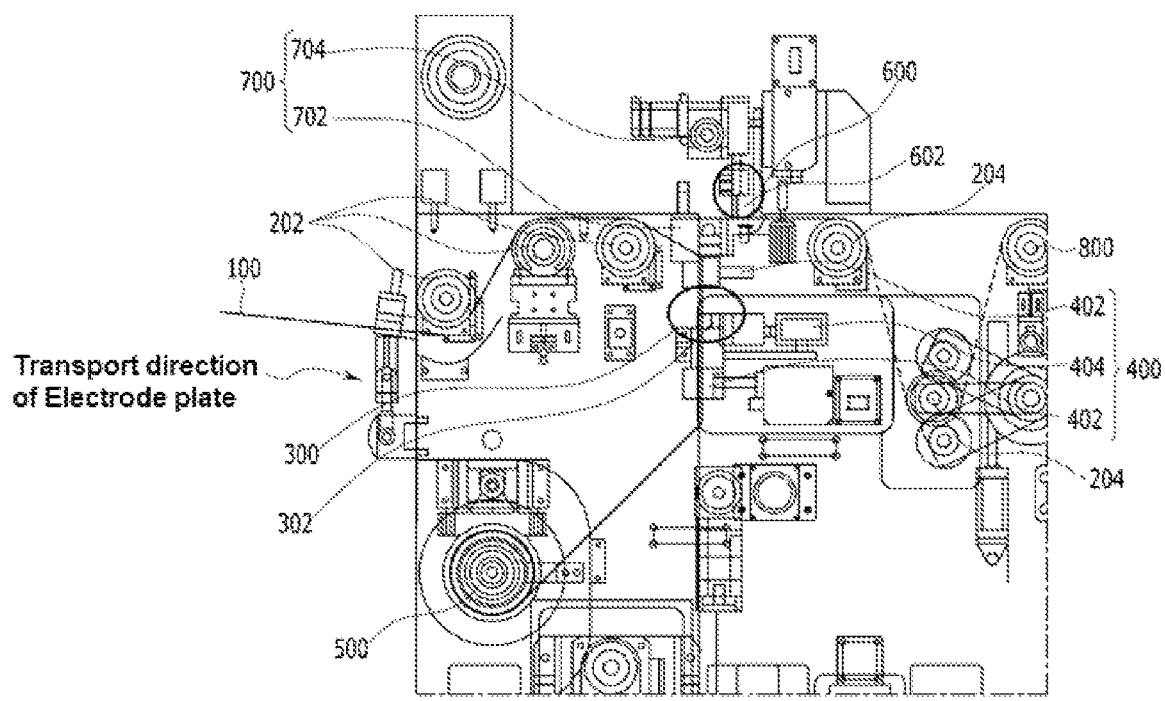

[FIG. 2]
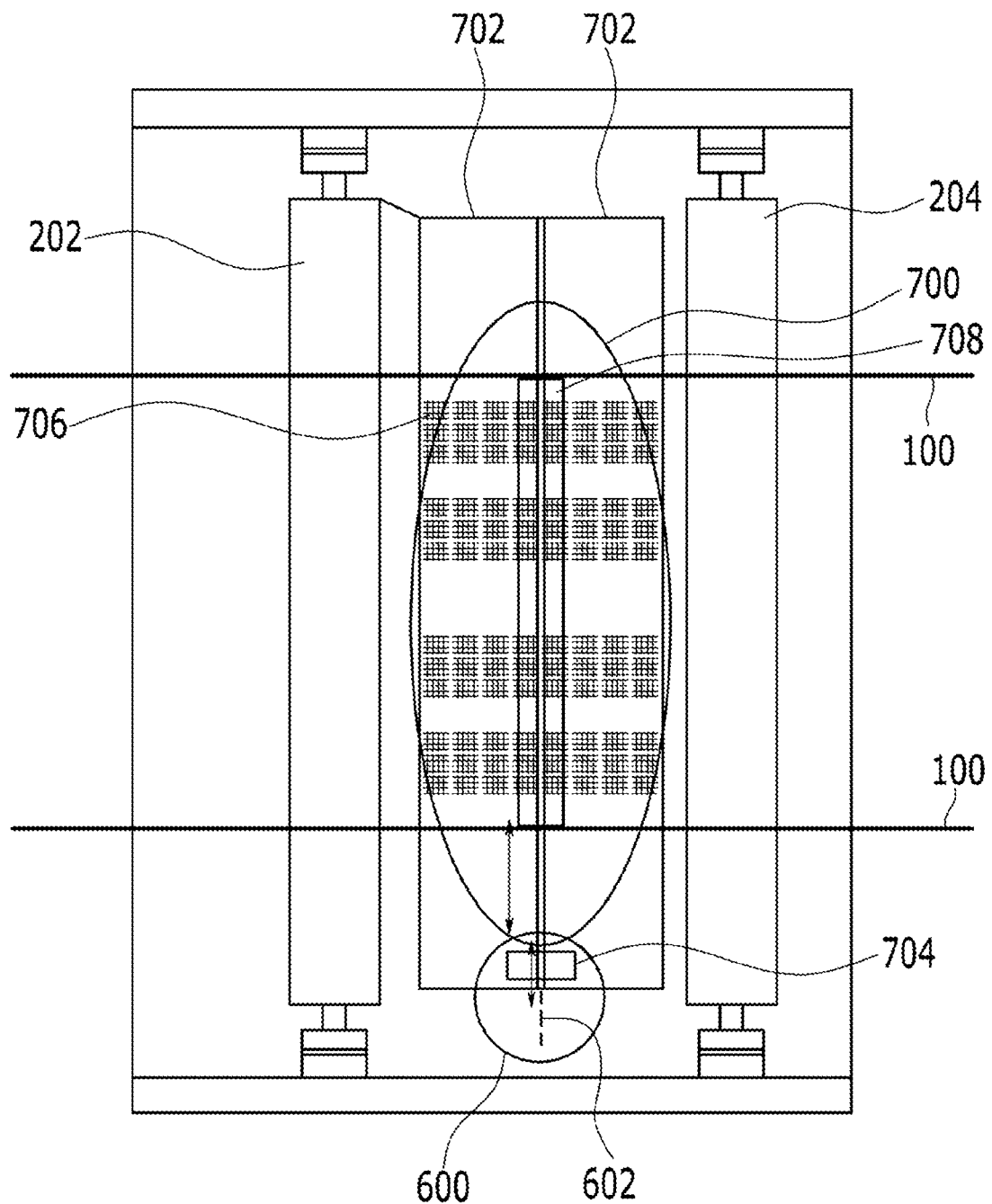

[FIG. 3]
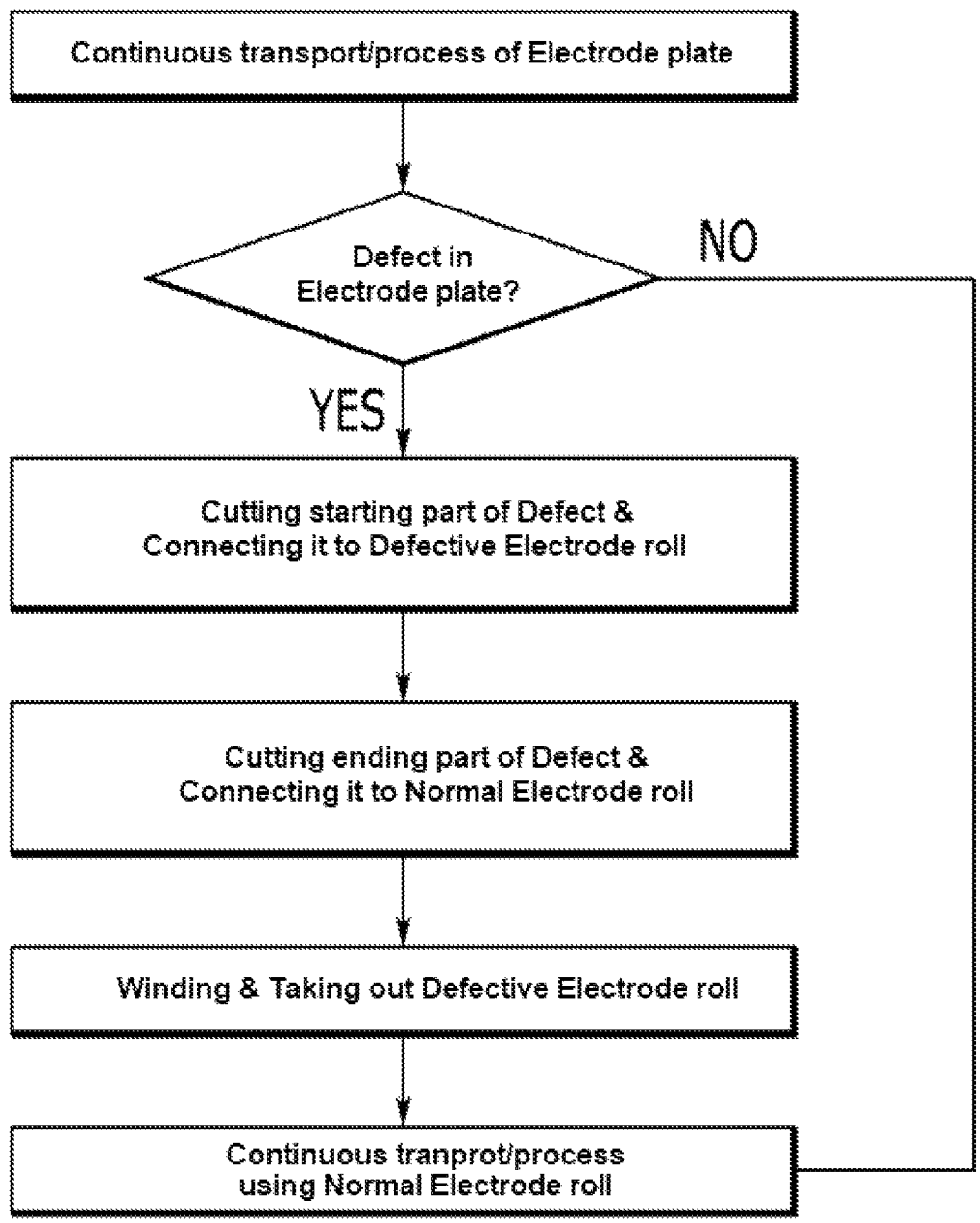

APPARATUS AND METHOD FOR CONTINUOUSLY MANUFACTURING ELECTRODE

CROSS-REFERENCE TO RELATED APPLICATION(S)

This is a National Phase entry pursuant to 35 U.S.C. 371 of International Application No. PCT/KR2022/003058 filed on Mar. 4, 2022, and claims priority to and the benefit of Korean Patent Application No. 10-2021-0030954 filed on Mar. 9, 2021 and Korean Patent Application No. 10-2022-0027640 filed on Mar. 3, 2022 in the Korean Intellectual Property Office, the contents of which are incorporated herein by reference in their entirety.

TECHNICAL FIELD

The present disclosure relates to an apparatus and method for continuously manufacturing electrode that can improve the mass productivity of the continuous electrode manufacturing process by automatically and continuously removing the electrode plate in which a defect occurs, in an apparatus for transferring and rolling an electrode plate to continuously manufacture an electrode.

BACKGROUND

The secondary battery can be formed by inserting an electrode assembly including electrode plates of a positive electrode plate and a negative electrode plate and a separator into a case, and then sealing the case. An electrode plate such as a positive electrode plate or a negative electrode plate is obtained by applying a composition containing an active material slurry to each electrode current collector to form a coating layer, and while such an electrode plate is continuously transported, it can be rolled with a roll press device or the like to manufacture each electrode.

At this time, the rolling step is a step of improving the adhesive property between the coating layer and the electrode current collector, and increasing the capacity density of the active material. After this rolling step, the rolled electrode plate can be dried and then cut to a predetermined size to finally continuously manufacture the electrodes contained in the secondary battery.

In such a continuous manufacturing process of an electrode, there are many cases in which defects occur in electrode plates that are put into a roll press device for rolling. For example, when an electrode plate in which a defect occurs is included inside a Jumbo roll on which the electrode plate is wound, it is necessary to remove and take out the electrode plate in which a defect occurs, in order to prevent a defect in the electrode.

However, in the conventional continuous electrode manufacturing apparatus and process, when a defect occurs in a part of the electrode plate as described above, an operator has no choice but to stop the operation of the electrode manufacturing facility and manually separately remove and take out the electrode plate in which a defect occurs.

As a result, not only a significant decrease in mass productivity occurs in the continuous manufacturing process of the electrode, but also a large workload is generated on the operator, which is one of the factors that a good electrode plate was mistakenly taken out as the defective electrode plate, or the defective electrode plate was not taken out which increased the defective rate of the electrode.

Due to these drawbacks, in the process of transporting and rolling the electrode plate to continuously manufacture an electrode, there has been a continuous demand for the development of a system that can automatically remove electrode plates in which a defect occurs and improve the mass productivity in the continuous electrode manufacturing process.

SUMMARY

Therefore, in an apparatus for continuously manufacturing an electrode by transferring and rolling an electrode plate, an object of the present disclosure is to provide an electrode continuous manufacturing apparatus that can improve the mass productivity of the electrode continuous manufacturing process by automatically and continuously removing and taking out the electrode plate in which a defect occurs.

Another object of the present disclosure is to provide a method capable of continuously manufacturing an electrode with high mass productivity by applying the apparatus for continuous manufacturing of the electrode.

However, the technical problem to be solved by embodiments of the present disclosure is not limited to the above-described problems, and can be variously expanded within the scope of the technical idea included in the present disclosure.

According to one aspect of the present disclosure, there is provided an apparatus for continuously manufacturing an electrode while transferring and rolling an electrode plate including a coating layer formed on an electrode current collector, the apparatus comprising:
   a plurality of guide rollers that continuously transports the electrode plate;
   a first cutting part that detects a defect in the electrode plate being continuously transferred and cuts the electrode plate at the starting part of the defect occurrence;
   a first taping part that connects the starting part of the defect occurrence of the cut electrode plate to the defective electrode roll;
   a defective electrode winding part that winds and takes out the defective electrode roll;
   a second cutting part that cuts the electrode plate at the ending part of the defect occurrence of the electrode plate;
   a second taping part that connects the normal electrode plate separated from the defective electrode plate in the second cutting part with the normal electrode roll; and
   a normal electrode winding part that winds and transports the normal electrode roll.

According to another aspect of the present disclosure, there is provided a method for continuously manufacturing an electrode using the apparatus of claim 1, the method comprising the steps of:
   detecting defects in the electrode plate while continuously transferring the electrode plate including the coating layer formed on the electrode current collector to the plurality of guide rollers;
   cutting the electrode plate at the starting part of the defect occurrence of the electrode plate, and taping and connecting the cutting part with the defective electrode roll;
   cutting the electrode plate at the ending part of the defect occurrence of the electrode plate, and taping and connecting the cutting part with the normal electrode roll; and taking out the defective electrode roll and continuously transferring the electrode plate from the normal electrode roll to manufacture the electrode.

According to the embodiments, when a defect occurs in a part of the electrode plate in the continuous process of the electrode, the electrode plate in which a defect occurs is continuously removed and taken out, while the remaining normal electrode plate can be connected to the normal electrode roll to continuously proceed the electrode manufacturing process including the subsequent rolling step.

As a result, it is not necessary to stop the electrode manufacturing equipment and manually remove the electrode plate in which a defect occurs, and the electrode can be continuously manufactured while being automatically removed during the continuous manufacturing process of the electrode. Therefore, it is possible to greatly improve the mass productivity for the manufacture of electrodes of secondary batteries such as lithium secondary batteries, and it is possible to greatly reduce the work load of workers.

Through this, in the electrode manufacturing process of the secondary battery, the defect rate of the electrode due to the defect occurrence of the electrode plate can also be greatly reduced.

BRIEF DESCRIPTION OF THE DRAWINGS

FIG. 1 is a cross-sectional view which schematically shows the continuous manufacturing apparatus of the electrode according to one embodiment of the present disclosure;

FIG. 2 is a top view which schematically shows the continuous manufacturing apparatus of the electrode according to one embodiment of the present disclosure; and FIG. 3 is a flowchart which schematically shows the continuous manufacturing method of the electrode by another embodiment of the present disclosure.

DETAILED DESCRIPTION

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

Further, throughout the description, when a portion is referred to as "including" or "comprising" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross portion cut vertically.

Meanwhile, FIG. 1 is a cross-sectional view which schematically shows the continuous manufacturing apparatus of the electrode according to one embodiment of the present disclosure. FIG. 2 is a top view which schematically shows the continuous manufacturing apparatus of the electrode according to one embodiment of the present disclosure. FIG. 3 is a flowchart which schematically shows the continuous manufacturing method of the electrode by another embodiment of the present disclosure.

As shown in FIGS. 1 and 2, according to an embodiment of the present disclosure, there is provided an apparatus for continuously manufacturing an electrode while transferring and rolling an electrode plate 100 including a coating layer formed on an electrode current collector, the apparatus comprising:

a plurality of guide rollers 202 and 204 that continuously transports the electrode plate 100;

a first cutting part 600 that detects a defect in the electrode plate 100 being continuously transferred and cuts the electrode plate 100 at the starting part of the defect occurrence;

a first taping part 400 that connects the starting part of the defect occurrence of the cut electrode plate 100 to the defective electrode roll;

a defective electrode winding part 500 that winds and takes out the defective electrode roll;

a second cutting part 300 that cuts the electrode plate 100 at the ending part of the defect occurrence of the electrode plate 100;

a second taping part 700 that connects the normal electrode plate separated from the defective electrode plate 100 in the second cutting part 300 with the normal electrode roll; and a normal electrode winding part 800 that winds and transports the normal electrode roll.

In the case of applying such a continuous manufacturing apparatus of an electrode, when a defect occurs in a part of the electrode plate 100 in the process of manufacturing the electrode while continuously transferring the electrode plate 100 to the guide rollers 202 and 204, the electrode plate 100 in which a defect occurs is cut at the first and second cut parts 600 and 300, respectively, and separated from the normal electrode plate 100.

Then, the starting part of the defect occurrence of the electrode plate 100 is connected to the defective electrode roll to which a defect has already occurred is connected in the second taping part 400, and the defective electrode roll including the defective electrode plate is continuously wound and taken out by the defective electrode winding part 500.

Further, the normal electrode plate 100 separated from the defective electrode plate 100 in the second cutting part 300 is connected to the normal electrode roll in the second taping part 700, so that the electrode manufacturing process including a subsequent rolling step or the like is continuously performed while continuously transferring the normal electrode roll.

Through this process, the defective electrode plate 100 is continuously removed and taken out from the normal electrode roll, while the remaining normal electrode plate 100 from which the defective electrode plate 100 has been removed is connected to the normal electrode roll, so that the electrode manufacturing process can be continuously performed.

As a result, the electrodes can be continuously manufactured while being automatically removed during the continuous manufacturing process of the electrodes, without need to stop the electrode manufacturing equipment and manually remove the defective electrode plate 100. Therefore, it is possible to greatly improve the mass productivity for manufacturing electrodes of secondary batteries such as lithium secondary batteries, and the workload of the operator can be significantly reduced, and further, the defect rate of the electrodes due to the occurrence of defects in the electrode plate can be significantly reduced.

Meanwhile, in the continuous manufacturing apparatus of the electrode according to the embodiment of the present disclosure, the plurality of guide rollers 202 and 204 include a first guide roller 202 and a second guide roller 204, and the first and second cutting parts 600 and 300 and the first and second taping parts 400 and 700 may be disposed between the first and second guide rollers 202 and 204.

Through such an arrangement, the electrode plate 100 is continuously transported through the first and second guide rollers 202 and 204, and the electrode plate 100 in which a defect occurs therebetween is effectively separated and removed, thereby connecting and taking out the defective electrode roll. The remaining normal electrode plate 100 is continuously connected with the normal electrode roll, so that the electrode manufacturing process can be continuously performed.

Further, in the continuous manufacturing apparatus of the electrode, when the first cutting part 600 detects and confirms the occurrence of a defect in the electrode plate 100 being continuously transferred, the electrode plate 100 is cut at the starting part of the defect occurrence, and the second cutting part 300 is cut at the ending part of the defect occurrence. In order to more effectively cut the defective electrode plate 100 and separate it from the normal electrode plate 100 in the first and second cutting parts 600 and 300 in this manner, the first and/or second cutting parts 600 and 300 may include cutters 602 and 302 that cut the electrode plate 100 being continuously conveyed perpendicular to the transport direction, respectively.

Referring to the plan view of FIG. 2 (however, in FIG. 2, the first cutting part and the first taping part installed on the lower part of the device are omitted), the cutters 602 and 302 provided in the first and/or second cutting parts 600 and 300 can cut the electrode plate 100 at the starting part and ending part of the defect occurrence while moving perpendicularly to the transport direction of the electrode plate 100.

Meanwhile, in the continuous manufacturing apparatus of the electrode, the first taping part 400 connects the defective electrode plate 100 cut in the first cutting part 600 with the defective electrode roll to which the previous defective electrode plates are connected, and the second taping part 700 connects the normal electrode plate 100 cut in the second cutting part 300 with the normal electrode roll to which the previous normal electrode plates are connected.

For interconnection of these electrode plates 100, the first and/or second taping parts 400 and 700 may include suction plates 402 and 702 that suck the electrode plate 100 and the connection part of the electrode roll, respectively; and taping compression rollers 404 and 704 that tape while applying pressure to the connection between the electrode plate 100 and the electrode roll. For reference, in the continuous manufacturing apparatus of FIG. 1, the suction plate 702 and the taping compression roller 704 are provided in the second taping part 700, and the suction plate 402 and the taping compression roller 404 are provided in the first taping part 400. Of course, only one of the first and second taping parts 400 and 700 may be provided with the suction plates 402 and 702 and the taping compression rollers 404 and 704.

Referring to the plan view of FIG. 2 (however, in FIG. 2, the first cutting part and the first taping part installed on the lower part of the device are omitted), the suction plates 402 and 702 may include a plurality of vacuum suction holes 706 that vacuum-suctions the electrode plates 100 to be connected to each other. The electrode plate 100 is fixed in position by the action of the vacuum suction hole 706, while a tape 708 for connection is added to one surface of these electrode plates 100. On the tape 708, the tape can be attached by applying pressure while the taping compression rollers 404 and 704 move along the connecting portion of the electrode plate 100, thereby connecting the electrode plate 100.

Meanwhile, in FIG. 2, the process in which for example, the electrode plates 100 of the suction plate 702 and the taping compression roller 704 provided in the second taping part 700 are connected by taping is shown, but even in the first taping part 400, the electrode plates 100 can be interconnected through the same process.

In the continuous manufacturing apparatus of the electrode described above, the first cutting part 600 and the first taping part 400 that cut the electrode plate 100 at the starting part of the defect occurrence and connect the defective electrode plate 100 with the defective electrode roll may be arranged adjacent to each other. Further, a second cutting part 300 and a second taping part that cut the electrode plate 100 at the ending part of the defect occurrence and connect the normal electrode plate 100 separated from the defective electrode plate 100 with the normal electrode roll may be arranged adjacent to each other. Due to this arrangement, the process of separating the defective electrode plate and connecting with the electrode roll can be made efficient.

Further, in order to enable effective removal and taking-out of the defective electrode plate 100 without disturbing the continuous transfer to the normal electrode plate 100 and the subsequent manufacturing process, the second cutting part 300 and the second taping part 700 may be formed along the transport direction of the electrode plate 100, and the first cutting part 600 and the first taping part 400 for separating and taking out the defective electrode plate 100 can be arranged in the lower part of the continuous manufacturing apparatus, for example, in the lower part of the second cutting part 300 and the second taping part 700, in a direction perpendicular to the transport direction of the electrode plate 100.

Further, in the continuous manufacturing apparatus of the present embodiment, in order to effectively separate and take out the electrode plate 100 in which the defect is detected from the first cutting part 600 and the first taping part 400 of the lower part of the device, a third guide roller may be further provided to transport the defective electrode plate toward the first cutting part 600 and the first taping part 400 in a direction perpendicular to the transport direction of the normal electrode plate 100.

Meanwhile, in the continuous manufacturing apparatus of the electrode, the defective electrode plate 100 separated from the normal electrode plate and connected to the defective electrode roll is continuously wound and taken out by the defective electrode winding part 500, and the normal electrode plate 100 separated from the defective electrode plate 100 is connected to the normal electrode roll, while it is wound and continuously transferred by the normal electrode winding part 800.

In this way, the normal electrode plate 100 wound by the normal electrode winding unit 800 and continuously transported may be subjected to subsequent electrode manufacturing processes such as subsequent rolling, drying, and cutting. For this subsequent electrode manufacturing process, a rolling roll (not shown) for rolling the normal electrode plate 100 may be further provided. In such a rolling roll, a pressure may be applied to the coating layer on the electrode plate 100 to proceed with the rolling process.

When the continuous manufacturing apparatus of the electrode of the above-described embodiments is applied as shown in FIG. 3, the electrode plate 100 including the coating layer formed on the electrode current collector is continuously transferred to the plurality of guide rollers 202 and 204 to detect a defect in the electrode plate, the starting part of the defect occurrence of the electrode plate 100 is cut in the first cutting part 600, while this cut part is taped/connected to the defective electrode roll in the first taping part 400, the ending part of the defect occurrence of the electrode plate 100 is cut in the second cutting part 300 to separate the defective electrode plate, while the cut part of the remaining normal electrode plate 100 is taped/connected to the normal electrode roll in the second taping part 700, the defective electrode roll including the defective electrode plate is continuously wound and taken out from the defective electrode winding part 500, and the normal electrode roll including the normal electrode plate is continuously wound and transported by the normal electrode winding part 800.

Further, with respect to the top electrode plate included in the top electrode roll, an electrode manufacturing process such as a subsequent rolling process may be continuously manufactured under continuous transfer.

Through this process, the electrode can be continuously manufactured while automatically removing the defective electrode plate during the continuous manufacturing process of the electrode, without need to stop the continuous electrode manufacturing equipment and manually remove the defective electrode plate, whereby the mass productivity for the manufacture of electrodes of secondary batteries such as lithium secondary batteries can be greatly improved, and the load and defect rate of workers can be greatly improved.

Although the invention has been shown and described above with reference to the preferred embodiments, the scope of the present disclosure is not limited thereto, and numerous other variations and modifications can be devised by those skilled in the art using the principles of the invention defined in the appended claims, which will also fall within the spirit and scope of the present disclosure.

DESCRIPTION OF REFERENCE NUMERAL

100: electrode plate
202, 204: first and second guide rollers
600: first cutting part
400: first taping part
500: defective electrode winding part
300: second cutting part
302, 602: cutter
700: second taping part
402, 702: suction plate
404, 704: taping pressing roller
706: vacuum suction hole
708: tape
800: normal electrode winding part

What is claimed is:

1. An apparatus for manufacturing an electrode, the apparatus comprising:
    a plurality of guide rollers configured to transport an electrode plate;
    a first cutting part configured to:
        detect a defect on the electrode plate being transported; and
        cut, upon detecting the defect, the electrode plate at a starting part of the defect on the electrode plate to form a defective electrode plate separated from a normal electrode roll;
    a first taping part configured to add a first tape to connect the starting part of the defect on the defective electrode plate to a defective electrode roll;
    a defective electrode winding part configured to wind the defective electrode roll;
    a second cutting part configured to cut the defective electrode plate at an ending part of the defect on the defective electrode plate to form a normal electrode plate separated from the defective electrode plate;
    a second taping part configured to add a second tape to connect the normal electrode plate to the normal electrode roll; and
    a normal electrode winding part configured to wind the normal electrode roll, and
    wherein the first cutting part and the second taping part are formed along a transport direction of the electrode plate, and
    wherein the second cutting part and the first taping part are formed under the first cutting part and the second taping part in a direction perpendicular to the transport direction of the electrode plate.

2. The apparatus for manufacturing the electrode according to claim 1, wherein
    the plurality of guide rollers comprises a first guide roller and a second guide roller, and
    wherein the first and second cutting parts and the first and second taping parts are between the first and second guide rollers.

3. The apparatus for manufacturing the electrode according to claim 1, wherein
    the first cutting part or the second cutting part comprises a cutter configured to cut the electrode plate during transport in a direction perpendicular to a transport direction.

4. The apparatus for manufacturing the electrode according to claim 1, wherein at least one of the first taping part or the second taping part comprises a taping compression roller configured to apply pressure while adding at least one of the first tape or the second tape, and
    wherein at least one of the first taping part or the second taping part comprises a suction plate that configured to suction the electrode plate while adding at least one of the first tape or the second tape.

5. The apparatus for manufacturing the electrode according to claim 1, wherein
    the second cutting part and the first taping part, and the first cutting part and the second taping part are formed adjacent to each other.

6. The apparatus for manufacturing the electrode according to claim 1, further comprising a third guide roller configured to transfer the defective electrode plate to the second cutting part and the first taping part.

7. A method for manufacturing the electrode using the apparatus of claim 1, the method comprising the steps of:
    detecting defects in the electrode plate while transferring the electrode plate with the plurality of guide rollers, the electrode plate including a coating layer formed on an electrode current collector;
    cutting the electrode plate at the starting part of the defect on the electrode plate to form the defective electrode plate;
    taping and connecting the starting part of the defect on the defective electrode plate to the defective electrode roll;

winding the defective electrode roll;

cutting the defective electrode plate at the ending part of the defect on the defective electrode plate to form a normal electrode plate;

taping and connecting the normal electrode plate to the normal electrode roll;

and winding the normal electrode roll without the defective electrode plate.

8. The method for manufacturing the electrode according to claim 7, wherein subsequent to winding the normal electrode roll, rolling the normal electrode plate with a rolling roll to apply a pressure to the coating layer on the normal electrode plate while transferring the normal electrode plate from the normal electrode roll.

9. The method for manufacturing the electrode according to claim 7, further comprising manufacturing a lithium secondary battery from the normal electrode plate.

* * * * *